(12) United States Patent
Anumolu et al.

(10) Patent No.: US 12,314,150 B1
(45) Date of Patent: May 27, 2025

(54) SYSTEMS AND METHODS FOR REAL-TIME MAPPING AND VISUALIZATION GENERATION OF SYSTEM COMPONENTS IN SOFTWARE SYSTEMS

(71) Applicant: Citibank, N.A., New York, NY (US)

(72) Inventors: Dinakar Anumolu, Irving, TX (US); Mayank Vinayaka, Irving, TX (US); Nalini Kavali, Irving, TX (US); Pranita Santosh Patil, Irving, TX (US); Richard Eric Lawton, Irving, TX (US); Sarthak Rajnikant Patel, Irving, TX (US); Sridatree Mukherjee, Pune (IN)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/762,362

(22) Filed: Jul. 2, 2024

(51) Int. Cl.
G06N 20/00 (2019.01)
G06F 11/30 (2006.01)
G06F 11/32 (2006.01)

(52) U.S. Cl.
CPC ........ G06F 11/3051 (2013.01); G06F 11/321 (2013.01)

(58) Field of Classification Search
CPC ............................ G06F 11/3051; G06F 11/321
See application file for complete search history.

(56) References Cited

U.S. PATENT DOCUMENTS

| | | | |
|---|---|---|---|
| 11,556,510 B1* | 1/2023 | Hanson | G06F 16/254 |
| 2020/0064823 A1* | 2/2020 | Somercik | G05B 23/0264 |
| 2020/0409831 A1* | 12/2020 | Balasubramanian | G06F 11/3476 |
| 2022/0058449 A1* | 2/2022 | Goodsitt | G06N 5/01 |
| 2023/0067944 A1* | 3/2023 | Ares | G06F 16/26 |
| 2024/0078244 A1* | 3/2024 | Moresmau | G06F 21/16 |

* cited by examiner

Primary Examiner — Shelby A Turner
Assistant Examiner — Christine Y Liao
(74) Attorney, Agent, or Firm — Foley & Lardner LLP

(57) ABSTRACT

Systems and methods for real-time mapping and visualization generation of system components and inter system communications as well as for the generation of real-time recommendations for architectural recommendations. The systems and methods generate hierarchical workflow mappings of a computational network using event data from software applications lineage logs as well as component and artifact repositories. For example, while event data in software applications lineage logs is conventionally limited to identifying that a given process occurred, the systems and methods use the plurality of events detailed in the software applications lineage logs to create, using an artificial intelligence model, a network mapping of how system components are arranged and interact.

19 Claims, 5 Drawing Sheets

SYSTEMS AND METHODS FOR REAL-TIME MAPPING AND VISUALIZATION GENERATION OF SYSTEM COMPONENTS IN SOFTWARE SYSTEMS

BACKGROUND

Modern computer systems have grown increasingly complex due to the expanding scope of their capabilities and the diverse requirements they are expected to meet. With the evolution of technology, processes are now tasked with handling vast amounts of data, supporting intricate software applications, and maintaining seamless connectivity across globally distributed software applications, cloud computing resources, and one or more microservices. This expansion requires sophisticated hardware architectures and advanced software designs, both of which need to be adaptable, secure, and efficient. Moreover, the integration of multiple subsystems, like processors, memory, networking, and storage, necessitates a careful orchestration to ensure optimal performance. The rise of cloud computing, IoT (Internet of Things), and artificial intelligence adds additional layers, as systems must interact with distributed resources and incorporate intelligent processing. Furthermore, modern systems must also be resilient against a growing landscape of cybersecurity threats and provide compliance with various regulatory standards, adding to the complexity. In this interconnected ecosystem, maintaining performance, security, scalability, and efficiency creates a challenging environment for globally distributed software applications.

SUMMARY

One approach to maintaining the performance, security, scalability, and/or efficiency of software systems and systems is to monitor and assess the various components of those networks and systems individually. Unfortunately, without understanding the connections, dependencies, and/or integrations of a given component, determining the upstream and/or downstream effects of a component is impossible. As such, the systems and method described herein for generating a mapping of dependencies across system components in a distributed architecture.

However, mapping dependency across system components in distributed architecture is technically challenging due to the dynamic, distributed, multi-tech and/or complex software systems. For example, modern infrastructures often involve multiple layers, from virtualization to application services, each with its own abstractions that obscure the underlying hardware. The distribution of these components across numerous data centers also makes it difficult to track their physical locations and interconnections, and cloud-based services may scale elastically, adding or removing resources based on demand, which makes the system topology highly fluid and ever-changing. Additionally, the presence of multi-tenant architectures, where different users and applications share resources while maintaining data and application isolation, further complicates mapping efforts due to the need to separate and accurately attribute resources to the right components. These technical challenges make comprehensive and accurate mapping of components a complex and often elusive task.

In view of the aforementioned technical challenges in mapping system components, systems and methods are described herein for novel functionality and/or improvements to mapping components in software systems. In particular, the systems and methods described herein allow for real-time mapping and visualization generation of system components and inter system communications as well as for the generation of real-time recommendations for architectural recommendations. To achieve these technical benefits, the systems and methods generate hierarchical workflow mappings of a computational network using event data from software applications lineage logs as well as component and artifact repositories. For example, while event data in software applications lineage logs is conventionally limited to identifying that a given process occurred, the systems and methods use the plurality of events detailed in the software applications lineage logs to create, using an artificial intelligence model, a network mapping of how system components are arranged and interact.

For example, the system generates training data based on historical software applications lineage logs that indicate respective time stamps, event names, system components, and/or other data for known software systems performing known processes. The training data may then be used to allow the artificial intelligence model to determine the series in which different events occur, the correlations between those events, and/or the hierarchical relationships between components in software system based on inputted software applications lineage logs. Once trained, the artificial intelligence model may receive an input of a current software application lineage logs to determine a programmatic component mapping. Having determined a component mapping, the system may generate visualizations of the relationships between the components as well as generate recommendations related to those relationships (e.g., configuration improvements, workflow redundancy reductions, etc.). Additionally or alternatively, the system may identify potential downstream effects of problems stemming from a given component (e.g., detected based on event data received related to that component) and identify potential impacts to subjected system(s) as a result of changes or enhancements in upstream components.

In some aspects, systems and methods for real-time mapping and visualization generation of system components as described. For example, the system may receive a first user request to generate a first visualization of a first configuration of a first subset of components in a first software system. The system may, in response to the first user request, retrieve a first software applications lineage, wherein the first software applications lineage log comprises a log of event data of current processes being performed in the first software system. The system may generate a first feature input based on the first software applications lineage log. The system may input the first feature input into a first artificial intelligence model to generate a first output, wherein the first artificial intelligence model is trained by: generating first training data based on historical software applications lineage logs that indicate respective time stamps, event names, components, or other data for known software system(s) configurations performing known processes; and training, using the first training data, the first artificial intelligence model to generate outputs comprises predicted software system(s) configurations based on inputs of current software applications lineage logs. The system may receive a first output from the first artificial intelligence model. The system may generate for display, on a user interface, the first visualization.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
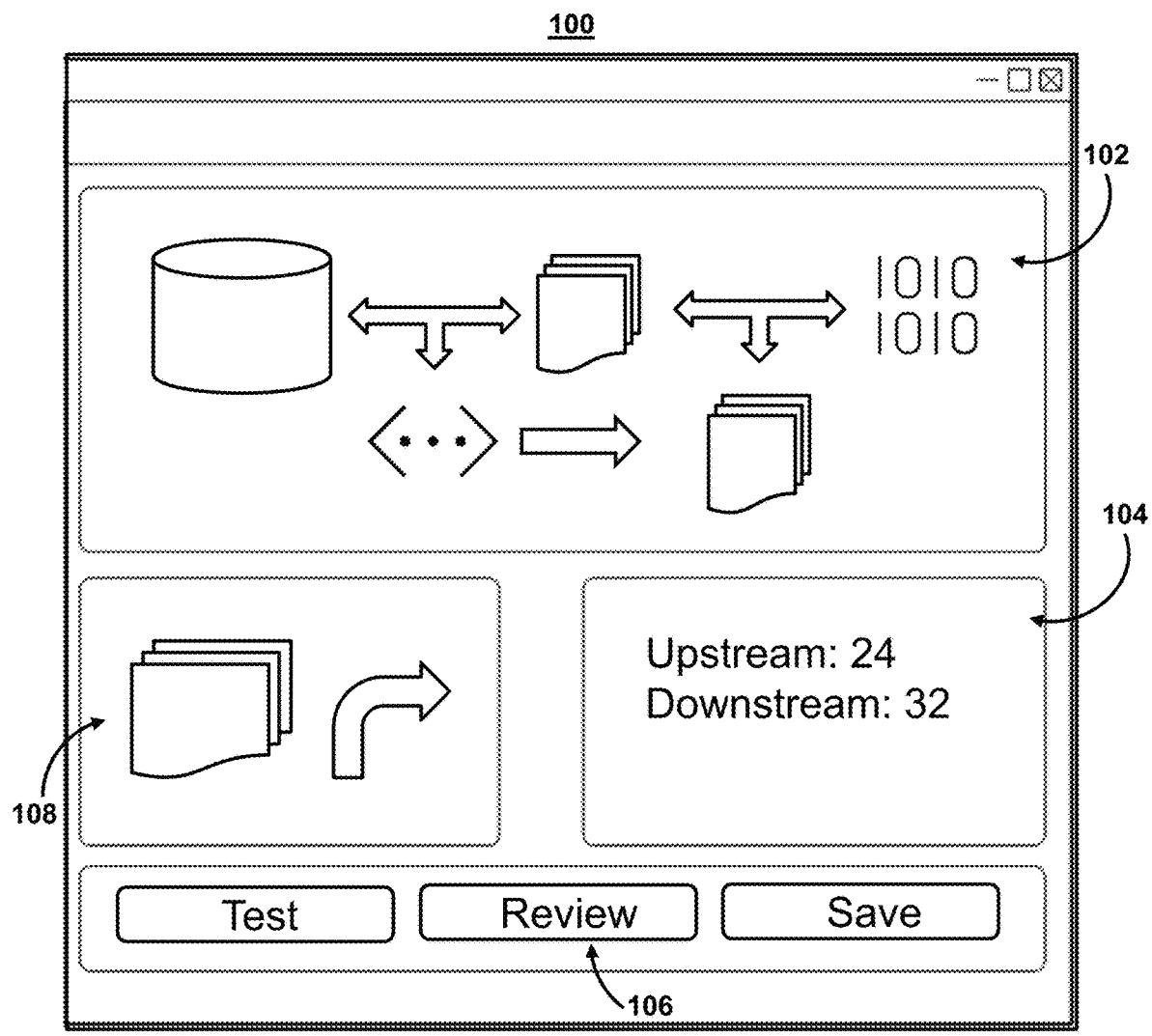
FIG. 1 shows an illustrative user interface displaying a visualization, in accordance with one or more embodiments.

FIG. 1 shows an illustrative user interface displaying a visualization, in accordance with one or more embodiments. For example, FIG. 1 shows user interface 100. As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

User interface 100 (and the underlying system used to power user interface 100) may allow for real-time mapping and visualization generation of system components and inter system communications. For example, real-time mappings and visualizations of system components and inter-system communications in a software system refers to the dynamic representation of the various elements and their interactions within a network as they occur (or would occur). These mappings may provide an up-to-the-moment depiction of hardware devices, such as servers, routers, switches, and endpoints, as well as software components, such as applications and services. The system may generate visualizations (e.g., visualization 102) on user interface 100 that display the physical and logical topology of the network, showing how components are connected and communicate with each other. The mapping and/or visualization can encompass data flows, packet transfers, and/or protocol exchanges, often represented through nodes and links, with varying colors and lines to indicate different types of connections and their statuses. For example, by employing techniques such as network traffic analysis and monitoring tools on software applications lineage logs, the system can determine mappings and create visualizations that help network administrators and IT professionals to quickly identify performance bottlenecks, detect anomalies and/or potential security threats, and ensure efficient and secure network operation.

For example, the system may generate hierarchical workflow mappings of a computational network using event data from software applications lineage logs as well as component and artifact repositories. The hierarchical workflow mappings of a computational network may refer to the structured representation of tasks and processes within a network, organized in layers of dependency and execution order. The system may generate a mapping that indicates how complex workflows are broken down into simpler, manageable components, often depicted in a tree-like structure. The system may then generate a visualization (e.g., visualization 102) based on this mapping. At the highest level, overarching processes or tasks may be displayed in a visualization (e.g., visualization 102), which may then be decomposed into sub-tasks or subprocesses at subsequent levels.

In some embodiments, a given component (e.g., a node, task, function, process, etc. in the mapping) may be selected as shown in icon 108. Each component in the hierarchy may represent a specific computational task or function, while the connections between nodes indicate the flow of data and control from one task to another. This hierarchical approach helps to illustrate the sequence and interdependencies of operations, ensuring that each task is completed before dependent tasks are initiated. By visualizing the entire workflow in a structured manner, these mappings enable more effective planning, monitoring, and optimization of computational processes. The system may also generate additional information (e.g., information 104) related to a component such as the connections and interdependencies.

For example, user interface 100 may generate real-time mappings and visualizations of system components and inter-system communications as well as additional information about the mapping, network, and/or one or more components. This additional information may include detailed metrics such as upstream/downstream dependencies and/or effects, bandwidth usage, latency, packet loss, and/or error rates for each connection and/or component, which may help in assessing the performance and health of the network. User interface 100 can also offer insights into the status of individual devices, such as CPU load, memory usage, and disk activity, allowing administrators to identify and address potential issues at the device level. Additionally, real-time alerts and notifications can be integrated to inform users of any anomalies, security threats, and/or performance degradations as they occur, enabling prompt response and mitigation. Visualization tools may include historical data and trend analysis, helping users to recognize patterns and predict future behavior. Interactive elements, such as zooming, filtering, and drill-down capabilities, enable users to focus on specific areas of interest or concern, providing a more granular view of the network's operation. Furthermore, integration with other network management tools and databases can enrich the visualizations with contextual information, such as device configurations, policy compliance, and user activity logs, leading to a more comprehensive understanding of the network environment.

User interface 100 may also be used to test specific components, save mappings and/or visualizations of configurations of components, and/or review mappings, visualizations, and/or components. For example, user interface 100 may include a plurality of icons (e.g., icon 106). For example, user interface 100 may be designed for managing and visualizing network components and their configurations can offer a range of icons and interactive elements that enhance usability and functionality. To test specific components, user interface 100 may include icons representing various diagnostic tools, such as ping tests, traceroutes, and performance benchmarks. These icons (e.g., icon 106), often shaped like tools or diagnostic symbols, allow users to initiate tests with a simple click, providing real-time feedback on the status and performance of individual components. For saving mappings and visualizations, user interface 100 might feature icons resembling floppy disks, clouds, or folders, enabling users to store their current network configurations and visualizations locally or in the cloud. This ensures that users can easily retrieve and review their saved configurations later.

Additionally, user interface 100 can include icons for reviewing past mappings, visualizations, and component statuses. These icons, which may be depicted as magnifying glasses, history symbols, or document stacks, provide access to logs and historical data, allowing users to compare current network states with previous ones. Interactive features such as hover-over tooltips, clickable nodes, and context menus enhance these icons, offering detailed information and additional options without cluttering the main display. By incorporating these intuitive icons and interactive elements, user interface 100 simplifies complex network management tasks, making it easier for users to monitor, diagnose, save, and/or review their components, configurations, and/or performance metrics thereof effectively.

The system may generate real-time mappings and visualizations of system components and inter-system communications as well as additional information about the mapping, network, and/or one or more components using event data in software applications lineage logs. Event data in a software applications lineage log may refer to a record of specific actions and/or occurrences within a software system. The event data may include timestamps, event types, user actions, system processes, data modifications, and/or interactions between different components or systems. For example, an event may be logged when data is ingested, transformed, queried, moved, and/or deleted, along with metadata about the source and destination of the data, the nature of the transformation, and the identities of the users or systems involved. By maintaining a comprehensive log of these events, the software applications lineage log may provide a transparent and auditable trail that helps in understanding how data is processed through a network and/or the components in that network.

In some embodiments, event data may be archived in a software applications lineage log through a systematic process that ensures the information is accurately captured, securely stored, and easily retrievable for future reference. When an event occurs within the network, the system may immediately (and/or at a predetermined frequency) record the event (or event data) in the software applications lineage log. The system may use a standardized and consistent data representation such as JSON or XML. Each log entry may include key details such as time stamps, event types, user and/or component identifiers, data sources and destinations, and descriptions of the actions performed. This log data is then stored in a centralized repository, often a dedicated database or a distributed storage system, designed to handle large volumes of data efficiently.

Figure 2:
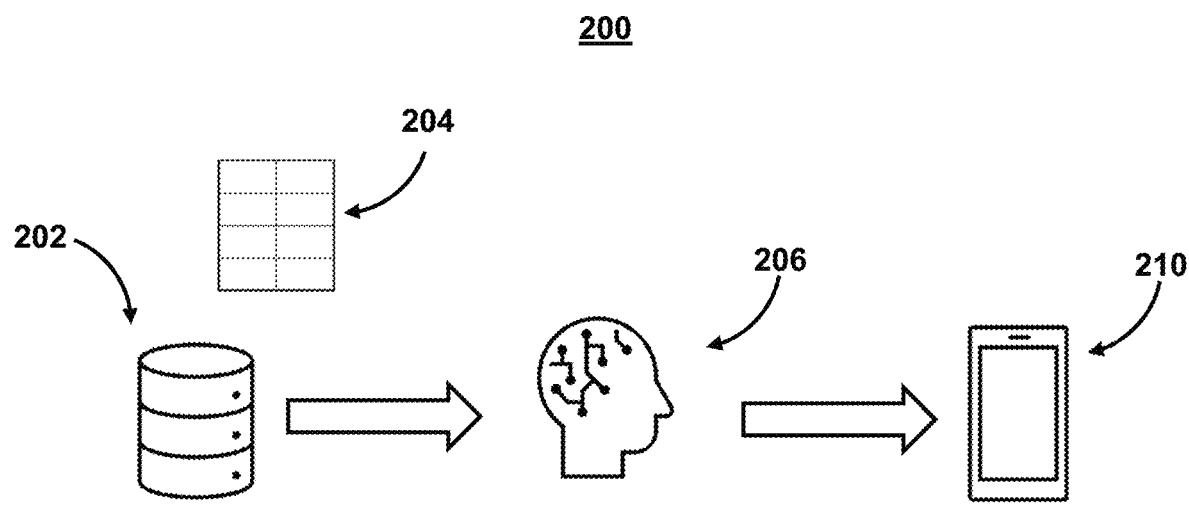
FIG. 2 shows an illustrative diagram for a system for mapping dependencies across system components, in accordance with one or more embodiments.

FIG. 2 shows an illustrative diagram for a system for mapping dependencies across system components, in accordance with one or more embodiments. For example, system 200 may use a plurality of events detailed in software applications lineage logs (e.g., software applications lineage log 204) to create, using an artificial intelligence model (e.g., model 206), a network mapping of how system components are arranged and interact (e.g., a configuration of subset of components in a software system(s)).

For example, system 200 may receive (e.g., via user interface 210) a first user request to generate a first visualization (e.g., on user interface 210) of a first configuration of a first subset of components in a first software system. The first visualization may comprise a hierarchical workflow mapping of the first subset of components. For example, a user may request system 200 generate a visualization as shown in FIG. 1 that includes a hierarchical workflow mapping and/or upstream and downstream connections of the first subset of components when processing user requests.

In response to the first user request, system 200 may retrieve a first software applications lineage log (e.g., software applications lineage log 204) from storage 202. The first software applications lineage log may comprise a log of event data of current processes being performed in the first software system. Additionally, the log of event data may comprise a plurality of characteristics for each event in the event data, wherein the plurality of characteristics includes a time stamp, component identifier, and/or process identifier. For example, a time stamp for an event may indicate when an event occurred. A component identifier for an event may indicate what component generated the event. A process identifier may indicate a process that generated the event.

Storage 202 may store the software applications lineage log for each process and/or event generated from the software system. For example, storage 202 may store historical software applications lineage logs that indicate respective time stamps, event names, components, or other data for known software system configurations performing known processes. For example, system 200 may store historical software applications lineage logs by capturing and recording detailed information about events and their contexts, ensuring that all relevant aspects of network configurations and processes are preserved. Each log entry may include a timestamp to record the precise time an event occurred, an event name to describe the nature of the activity, identifiers for the involved components, and/or additional metadata related to the event and the network configuration. This information is structured in a consistent format, such as JSON, XML, or a relational database schema, allowing for uniformity and ease of access.

For example, system 200 may archive event data by systematically capturing and recording each event's details, including timestamps, event names, components, and other relevant data, as they occur within known software system configurations performing specific processes. When an event is triggered, the system generates a log entry that includes a precise timestamp, ensuring an accurate record of when the event took place. The event name provides a clear description of the action or occurrence, while component identifiers indicate which parts of the network were involved. Additional metadata may include user IDs, process identifiers, data states before and after the event, and any relevant contextual information.

Once captured, the logs are stored in a centralized and secure repository (e.g., storage 202). In some embodiments, storage 202 may be a relational database, a NoSQL database, or a distributed file system, depending on the volume and nature of the data. To facilitate efficient storage and retrieval, system 200 may employ indexing and tagging mechanisms, which organize the logs based on key attributes such as timestamps, event types, and component identifiers. To ensure data integrity and security, system 200 may use encryption to protect sensitive information and implements access control policies to restrict who can view or modify the logs.

System 200 may generate training data (which may be stored in storage 202) based on the historical software applications lineage logs. System 200 may generate training data based on historical software applications lineage logs by systematically extracting and labeling event data from these logs, which contain detailed records of known component configurations performing known processes. For example, system 200 may aggregate the historical software applications lineage logs, ensuring that all events, including timestamps, event names, component identifiers, and other relevant metadata, are collected. Each log entry may already be associated with specific configurations and processes, providing a rich source of labeled data.

System 200 may then preprocesses the logs to clean and normalize the data, removing any inconsistencies, duplicates, or irrelevant entries. This may involve parsing the log entries to extract key attributes and transforming them into a standardized format suitable for machine learning. For example, timestamps might be converted into numerical formats, event names categorized, and component identifiers encoded. System 200 may then label the data by associating each log entry with its corresponding configuration and/or process. This labeling may be guided by the metadata within the logs, ensuring that each entry is correctly matched with the known configuration and process it pertains to. These labeled entries are then organized into structured datasets, where each row represents an individual event with its associated features and labels.

System 200 may also perform feature engineering to create new features from the existing data, enhancing the predictive power of the training dataset. This could include deriving metrics such as event frequencies, durations, or patterns of component interactions. The final training dataset is then split into training, validation, and test sets to ensure robust model development and evaluation.

By leveraging historical software applications lineage logs in this manner, the system creates comprehensive and accurately labeled training datasets that reflect real-world network behaviors and configurations. These datasets can then be used to train machine learning models for various purposes, such as detecting known configurations of a software system based on the event data in a software applications lineage log. For example, system 200 may determine that the historical software applications lineage log for a given known configuration of components is similar to that of a current software applications lineage log. Based on the similarity, system 200 may determine that the current software system has the known configuration.

For example, system 200 may capture a real-time software applications lineage log of the current network configuration as it executes a targeted process. This log may include detailed records such as timestamps, event names, component identifiers, and other relevant metadata that describe the behavior and interactions of the network components during the process. The system then retrieves historical software applications lineage logs that document known configurations performing the same process. These historical logs may serve as reference points, containing well-documented configurations and their corresponding behaviors during the execution of the process. The system uses these logs to create a baseline or template of what the process should look like when performed by different known configurations.

To compare the current software applications lineage log with the historical logs, system 200 employs various analytical techniques. It starts by aligning the events in the current log with those in the historical logs, ensuring that the sequence and timing of events are comparable. Key metrics such as event frequencies, durations, and the specific components involved are analyzed. System 200 may also look for patterns and anomalies by examining the similarities and differences between the current and historical logs.

In some embodiments, system 200 may use pattern recognition techniques to enhance the comparison process. These algorithms can detect subtle differences and identify deviations that might not be immediately obvious. For instance, if the current configuration exhibits a delay in certain events or involves additional components not present in the historical logs, these discrepancies may indicate a new configuration, component, etc.

Based on the comparison results, the system can infer the current configuration by identifying which known configuration most closely matches the current log's characteristics. If the current configuration does not match any known configuration, the system may either classify it as a new configuration or highlight specific differences for further investigation. This comparison process enables the system to accurately identify and understand the current network configuration, facilitating effective monitoring, troubleshooting, and optimization of the network's performance.

System 200 may then generate for display, on user interface 210, the first visualization based on the first output, wherein the first visualization comprises a first mapping of the first configuration (e.g., visualization 102 (FIG. 1)). System 200 may then receive a second user request to perform a test a first component in the first subset of components as shown in the first visualization. System 200 may then determine a child component for the first component based on the first visualization. The system may the generate a result to the test based on an effect on the child component.

For example, after determining a mapping of a network configuration, a system determines the effect of a downstream component by analyzing the dependencies and data flow between interconnected components within the network. Once the configuration mapping is established, which details how each component is connected and interacts, the system may identify the downstream components relative to a particular upstream component or event.

System 200 may begin by tracing the data paths and communication channels from the source component through the network, mapping out the sequence of components that the data or signal traverses. This involves examining the software applications lineage logs, which provide records of data flows, transformations, and interactions across the network. By understanding these pathways, the system can identify which components are downstream and how they are affected by changes or events in upstream components.

To determine the specific effects on downstream components, system 200 performs a detailed analysis of the data dependencies and interaction patterns. This includes assessing how data transformations, delays, errors, or performance variations in the upstream component propagate through the network. For instance, if an upstream server experiences a performance bottleneck, the system analyzes how this impacts the data processing times and throughput in downstream servers, applications, or databases.

Advanced analytical techniques, such as impact analysis and dependency graphs, are used to quantify and visualize these effects. System 200 might simulate different scenarios to predict how changes in the upstream component will ripple through the network, affecting performance, reliability, and data integrity in downstream components. Machine learning models trained on historical data can also be utilized to predict the likely impacts based on past occurrences and patterns. Additionally, the system monitors real-time metrics and logs to detect immediate effects on downstream components, such as increased latency, error rates, or reduced performance. Alerts and notifications can be generated to inform network administrators of any adverse impacts, allowing for timely intervention and mitigation. By systematically analyzing the relationships and dependencies within the network configuration, the system can accurately determine the effects on downstream components, providing valuable insights for maintaining network performance, troubleshooting issues, and optimizing overall network operations. The system may then make recommendations related to the effects.

Figure 3A:
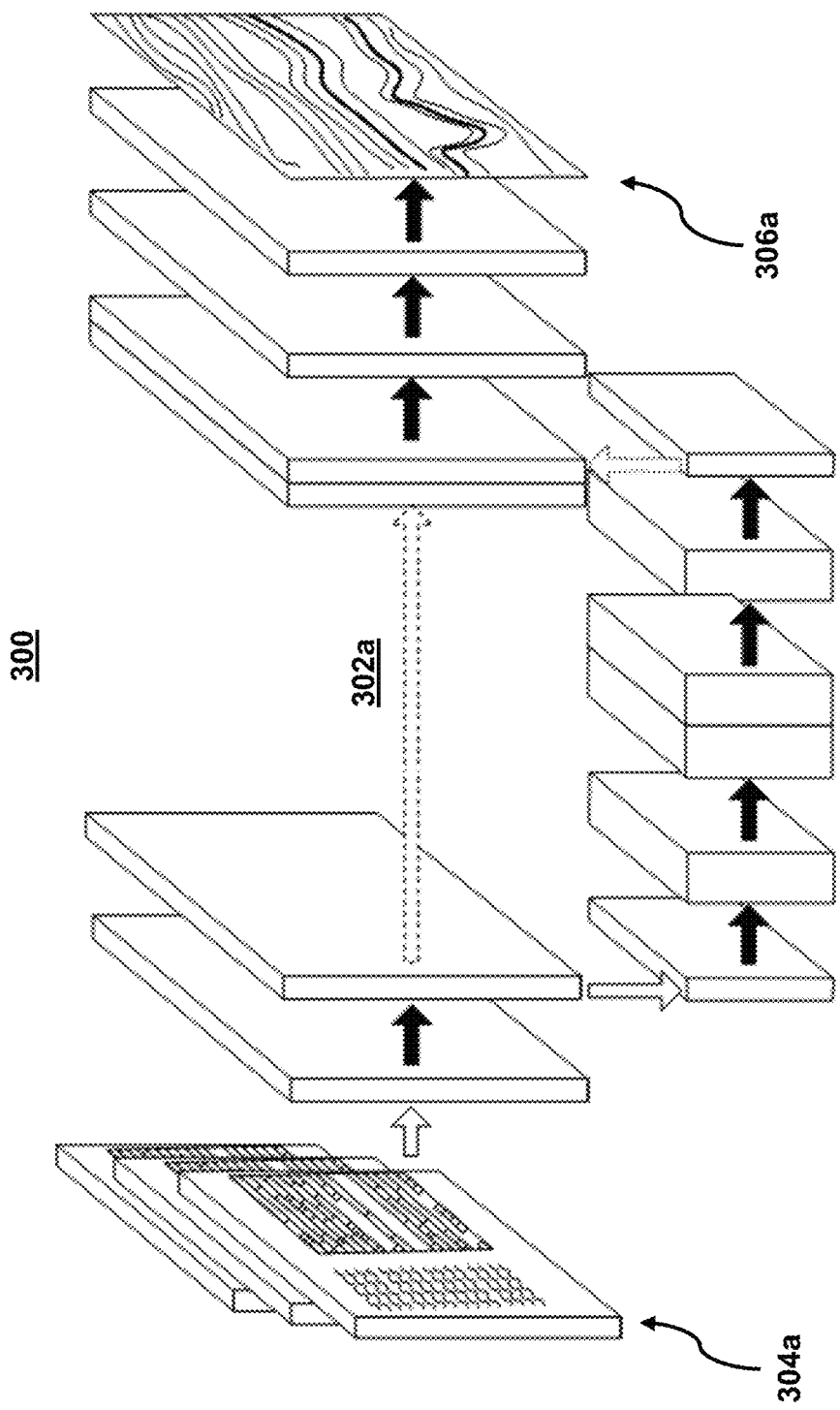
FIGS. 3A-B show illustrative components for a system used to generate a mapping of dependencies across system components in a distributed architecture, in accordance with one or more embodiments.
Figure 3B:
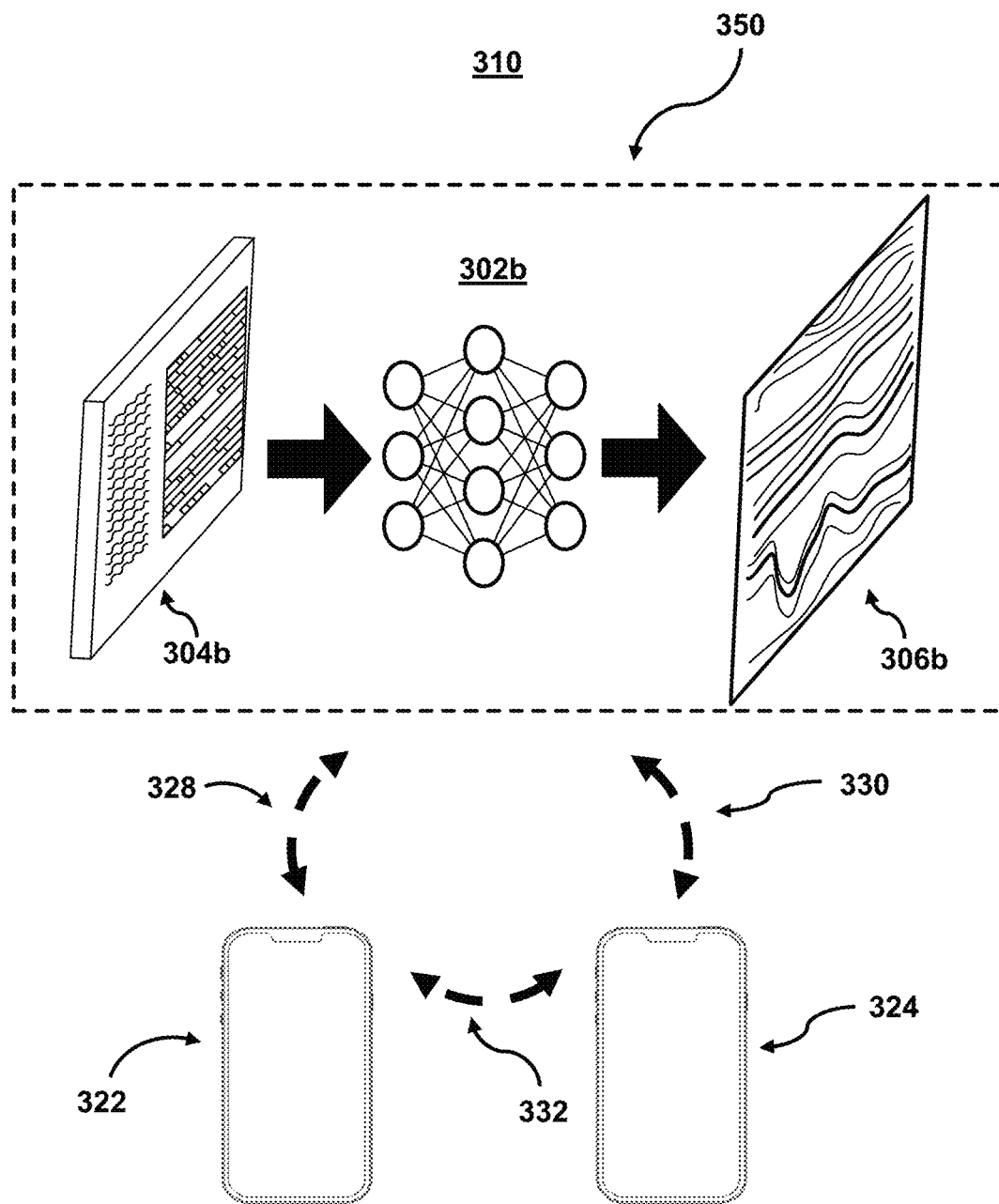

FIGS. 3A-B shows illustrative components for a system used to generate a mapping of dependencies across system components in a distributed architecture, in accordance with one or more embodiments. For example, FIG. 3A may represent a model architecture used to determine configurations based on software applications lineage logs.

System 300 also includes model 302a, which may be a machine learning model, artificial intelligence model, etc. (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., a configuration, an effect on an upstream and/or downstream component, recommendations for components, etc.).

For example, as described herein, system 300 may train, using training data based on based on historical software applications lineage logs that indicate respective time stamps, event names, components, or other data for known software system configurations performing known processes, a model to generate outputs comprises predicted software system configurations based on inputs of current software applications lineage logs. In some embodiments, during the training phase, system 300 employs machine learning algorithms, such as decision trees (e.g., a tree component classifier), random forests, and/or neural networks, to learn the relationships between the input features (e.g., timestamps, event names, components) and the target labels (known network configurations). The model iteratively adjusts its parameters to minimize prediction errors, using techniques like gradient descent and backpropagation for neural networks.

The model is trained to recognize patterns and correlations in the historical data that indicate specific network configurations. By learning these patterns, the model becomes capable of making predictions about the network configuration based on new, current software applications lineage logs. The validation set is used to fine-tune the model, ensuring it generalizes well to new data and does not overfit the training data. Once the model is trained and validated, it is tested on the test set to assess its accuracy and reliability. The final model can then be deployed to generate outputs comprising predicted software system configurations when provided with inputs of current software applications lineage logs. As the system receives new data over time, it can continuously update and retrain the model, incorporating fresh information to maintain accuracy and adapt to changes in the network's behavior and configurations. By leveraging historical software applications lineage logs, the system effectively trains a model that can predict current network configurations, enabling proactive monitoring, troubleshooting, and optimization of the network's performance based on real-time data inputs. For example, system 300 may generate a first feature input based on the first software applications lineage log. System 300 may then input the first feature input into a first artificial intelligence model to generate a first output, wherein the first artificial intelligence model is a tree component classifier.

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to predict a configuration, an effect on an upstream and/or downstream component, recommendations for components, etc.

FIG. 3B shows illustrative components for a system used to generate a mapping of dependencies across system components in a distributed architecture, in accordance with one or more embodiments. For example, FIG. 3B may show illustrative components for determining configurations based on software applications lineage logs. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system, and may feature one or more component devices. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. Alternatively or additionally, API layer 350 may reside on one or more of cloud components. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., a configuration, an effect on an upstream and/or downstream component, recommendations for components, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
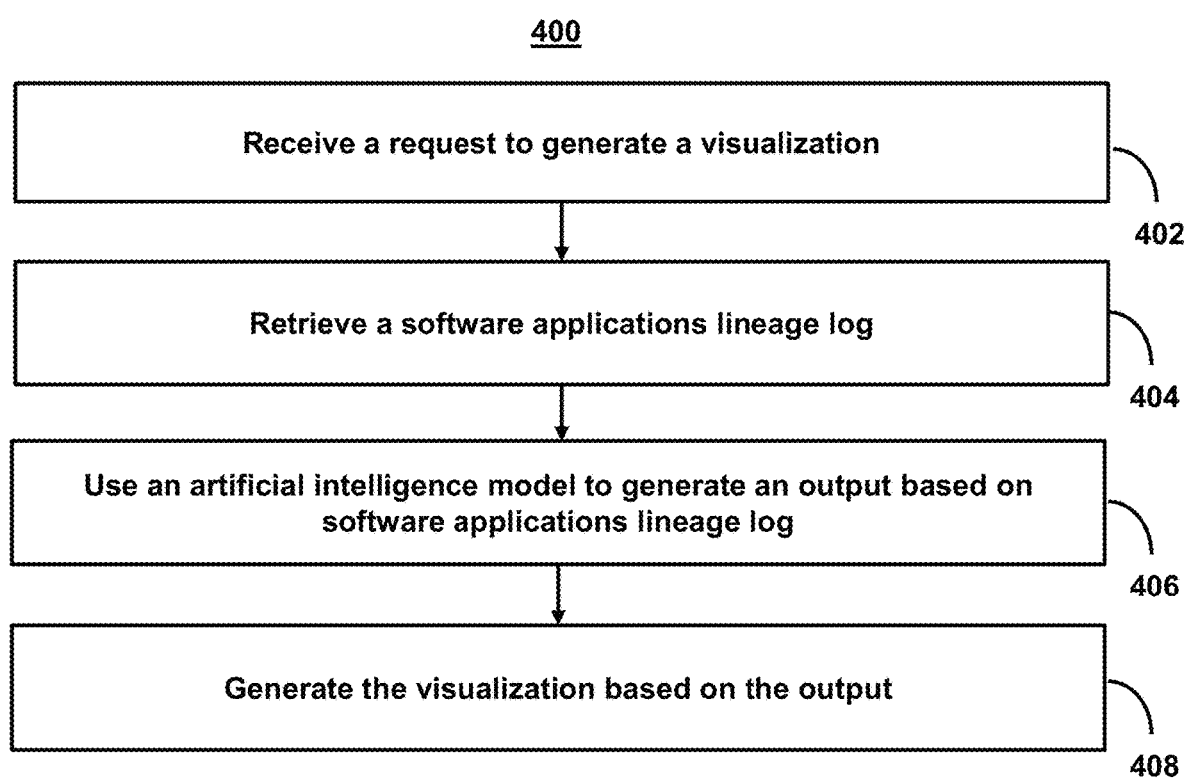
FIG. 4 shows a flowchart of the steps involved in real-time mapping and visualization generation of system components, in accordance with one or more embodiments.

FIG. 4 shows a flowchart of the steps involved in real-time mapping and visualization generation of system components, in accordance with one or more embodiments. For example, the system may use process 400 (e.g., as implemented on one or more system components described above) in order to provide real-time mapping and visualization generation of system components.

At step 402, process 400 (e.g., using one or more components described above) receives a request to generate a visualization. For example, the system may receive a first user request to generate a first visualization of a first configuration of a first subset of components in a first software system.

At step 404, process 400 (e.g., using one or more components described above) retrieves a software applications lineage log. For example, the system may, in response to the first user request, retrieve a first software applications lineage log (e.g., from storage), wherein the first software applications lineage log comprises a log of event data of current processes being performed in the first software system.

At step 406, process 400 (e.g., using one or more components described above) uses an artificial intelligence model to generate an output based on software applications lineage log. In some embodiments, the artificial intelligence model may be trained using training data. For example, the system may train a tree component classifier to classify nodes into component types and train the tree component classifier to identify edges between the nodes. The system may train a tree component classifier to classify nodes into component types and identify edges between nodes through a structured training process involving labeled data, feature extraction, and model training. To do so, the system collects a comprehensive dataset of network configurations, where each configuration includes detailed information about the nodes (components) and their interconnections (edges). This dataset is labeled, meaning that each node is annotated with its corresponding component type (e.g., server, router, switch) and each edge is annotated with the nature of the relationship or data flow between nodes. The system preprocesses the dataset by extracting relevant features from the nodes and edges. For nodes, features might include attributes such as component identifiers, performance metrics, roles within the network, and other contextual information. For edges, features might encompass connection types, data flow directions, bandwidth usage, latency, and error rates. With the features extracted, the system constructs a training set where each node is represented by its feature vector and labeled with its component type. Similarly, for edges, the training set includes pairs of nodes (or connections) represented by their combined features and labeled with the type of relationship or interaction. The system then trains the tree component classifier, which is typically a decision tree or a more complex ensemble of trees like a random forest. During training, the classifier learns to distinguish between different component types based on the feature vectors of the nodes. It builds decision rules by recursively splitting the feature space to best separate the nodes according to their labels, creating a hierarchical tree structure where each leaf node represents a component type classification. For identifying edges, the system trains the classifier to recognize patterns in the relationships between nodes. This involves learning which features and combinations of features are indicative of specific types of connections. The classifier uses this knowledge to predict the presence and type of edge between any given pair of nodes.

Once trained, the tree component classifier can classify new nodes into their respective component types based on their feature vectors and identify edges between nodes by predicting the types of connections that should exist based on the learned patterns. This enables the system to accurately map out network configurations and understand the relationships between different components, facilitating tasks such as network monitoring, optimization, and troubleshooting.

The system may generate a first feature input based on the first software applications lineage log. In some embodiments, the system generates a feature input based on a software applications lineage log by extracting and transforming relevant information from the log entries into a structured format suitable for models. This process begins with the system parsing the software applications lineage log, which contains detailed records of events, such as timestamps, event names, component identifiers, and other metadata related to the network's activities. The system may then order the event data based on the first time stamp.

In some embodiments, the system may identify the key attributes from the log that are relevant for the specific machine learning task. These attributes might include the time each event occurred, the type of event, the components involved, the duration of processes, data flow quantities, and any error or performance metrics recorded. The system may then clean the data by handling missing values, correcting inconsistencies, and normalizing the data to ensure uniformity.

In some embodiments, the system performs feature engineering to create new, informative features from the raw log data. This might involve aggregating events to capture higher-level trends, such as the frequency of specific event types over a period, or calculating the time intervals between related events to understand process durations. Additionally, the system might derive features that reflect the state of the network, such as the load on particular components or the number of active connections at different times.

Once the relevant features are identified and engineered, the system may organize them into a feature vector for each log entry or a sequence of entries, depending on the nature of the analysis. For example, a feature vector might include the timestamp, the encoded event name, the identifiers of the involved components, the duration of the event, and any other derived metrics. These feature vectors are then normalized and scaled as necessary to ensure compatibility with machine learning algorithms.

The resulting feature inputs are then assembled into a dataset, where each row represents a set of features corresponding to a specific event or time window within the software applications lineage log. This dataset is used to train, validate, and test machine learning models, enabling the system to learn patterns and make predictions based on new software applications lineage logs. By transforming software applications lineage logs into structured feature inputs, the system effectively captures the essential aspects of network events and behaviors, providing a robust foundation for machine learning applications.

The system may then input the first feature input into a first artificial intelligence model to generate a first output. The first artificial intelligence model may be trained by generating first training data based on historical software applications lineage logs that indicate respective time stamps, event names, components, or other data for known software system configurations performing known processes. The system may then train, using the first training data, the first artificial intelligence model to generate outputs comprises predicted software system configurations based on inputs of current software applications lineage logs.

In some embodiments, generating the first output may comprise the system determining a first component in a first hierarchical level in the first configuration and determining a parent component for the first component based on the first feature input indicating that the parent component inputs processing data to the first component in the first configuration. Additionally or alternatively, the system may determine a child component for the first component based on the first feature input indicating that the child component receives processing data from the first component in the first configuration. For example, to determine the first component in a hierarchical level, the model may examine the attributes of the feature input to identify components that perform specific roles or functions within the network. These components are categorized based on their operational characteristics and their position within the data processing hierarchy. The model may use predefined criteria or learned patterns to classify the first component as belonging to the first hierarchical level. Once the first component is identified, the model then seeks to determine its parent/child component. This involves analyzing the feature input to trace back the data flow to the component that supplies processing data to the first component. The feature input provides crucial details about the data sources and destinations, including timestamps, event types, and component identifiers, which the model uses to map the data pathways. By identifying the component that inputs processing data to the first component, the model effectively determines the parent-child relationship between components in the configuration. The parent component is the one that directly influences the operation of the first component by supplying the necessary data for processing, whereas the child component is a dependent component. The model may generate an output that includes the identified first component, its hierarchical level, and its parent/child component. This output provides a clear representation of the network configuration, highlighting the dependencies and data flow paths that define the structure and operation of the network.

In some embodiments, the system may generate the first output by determining a first component in a first hierarchical level in the first configuration and determining a second component in the first hierarchical level in the first configuration based on the first feature input indicating that the first component generates a first event datum within a threshold time of the second component generating a second event datum. For example, to establish a dependency, the system first identifies the occurrence of a first event datum generated by the first component. It then looks for a second event datum generated by the second component within a specified threshold time from the first event. This threshold time is a predefined interval that the system uses to determine temporal proximity, suggesting a potential causal or dependency relationship between the two events. In some embodiments, the system applies a temporal analysis algorithm to compare the timestamps of the events. If the second event datum occurs within the threshold time after the first event datum, the system infers that there is likely a dependency between the two components. This means the operation or state of the second component is influenced by or related to the operation or state of the first component. To ensure accuracy, the system may analyze multiple instances of these events over time. Consistent patterns of the first component's events being followed by the second component's events within the threshold time strengthen the evidence of a dependency. The system might also consider additional contextual information from the software applications lineage logs, such as the nature of the events, data flows, and any error or performance metrics associated with the components.

In some embodiments, the system may generate a first output by determining a first component in a first hierarchical level in the first configuration and determining a second component in the first hierarchical level in the first configuration based on the first feature input indicating that a third component receives processing data from both the first component and the second component. Additionally or alternatively, the system may generate a first output by determining a first component in a first hierarchical level in the first configuration and determining a second component in the first hierarchical level in the first configuration based on the first feature input indicating that a third component transmits processing data to both the first component and the second component. For example, the system may determine a location or hierarchically level of a component by determining that the component receives data from (or transmits data to) other components that have known locations and/or hierarchically levels.

In some embodiments, the system may identify inconsistencies. In response to identifying the inconsistencies the system may perform additional actions. For example, the system may generate a first output by detecting an inconsistency between a determined hierarchical level in the first configuration for a first component in a first hierarchical level in the first configuration and a first event datum for the first component. In response to detecting the inconsistency, the system may query the first software applications lineage log for additional event data and/or query a supplemental data source of potential network configurations of the first software system. For example, the system may identifies inconsistencies in software applications lineage logs by continuously monitoring and analyzing the events and configurations recorded in these logs. The system may parse and structure the software applications lineage logs, ensuring that all events, timestamps, component identifiers, and hierarchical levels are accurately captured and organized. The system may then establish a baseline of expected configurations and behaviors based on historical data and predefined rules. This baseline includes the hierarchical levels of components and their expected interactions and event patterns. For instance, the system may determine that a particular component should generate specific events when operating correctly within its designated hierarchical level. To detect inconsistencies, the system may compare real-time software applications lineage logs against this baseline. It monitors events as they occur and checks if they align with the expected patterns. If the system detects an inconsistency, such as a first event datum for a component that does not match its determined hierarchical level in the current configuration, it flags this as a potential issue. Upon detecting an inconsistency, the system triggers additional actions to further investigate and resolve the issue. One such action is querying the first software applications lineage log for additional event data. This involves a deeper analysis of past events related to the component in question, looking for anomalies, irregularities, or patterns that might explain the inconsistency. Simultaneously, the system may query a supplemental data source containing information about potential network configurations. This supplemental data source provides a broader context and alternative configurations that might be relevant. By comparing the current configuration and events against these potential configurations, the system can identify if the inconsistency is due to a recent change, an unexpected behavior, or a misconfiguration.

The system uses these additional queries and comparisons to generate a first output that details the inconsistency and suggests possible causes and solutions. This output might include a summary of the detected anomaly, the results of the additional queries, and recommendations for corrective actions. The system may then generate for display information based on this output. Network administrators can then use this information to address the inconsistency, ensuring the network operates correctly and efficiently.

At step 408, process 400 (e.g., using one or more components described above) generates the visualization based on the output. For example, the system may generate for display, on a user interface, the first visualization based on the first output, wherein the first visualization comprises a first mapping of the first configuration.

In some embodiments, the system may generate for display, on the user interface, the first visualization by determining a first component in a first hierarchical level in the first configuration and generating a first architecture diagram of a plurality of components in the first visualization, wherein the first component is included in the plurality of components at the first hierarchical level of the first architecture diagram. For example, system may generate the first architecture diagram. This diagram may visually represent the network configuration, with components organized according to their hierarchical levels. The first component may be placed at its appropriate level, and the other components are arranged accordingly to reflect their roles and interactions within the network. The diagram is constructed using graphical elements like nodes for components and edges for the connections between them. The system may use visualization tools and libraries to create the architecture diagram, ensuring it is clear and informative. This may involve selecting suitable shapes, colors, and layouts to distinguish different types of components and hierarchical levels. The connections between components are depicted with arrows or lines, indicating the direction and nature of data flows or dependencies. Once the architecture diagram is generated, the system may integrate it into the user interface for display. This involves embedding the diagram within a user-friendly interface that allows users to interact with and explore the visualization. Users can click on components to view more detailed information, zoom in and out for different levels of detail, and possibly filter or highlight specific aspects of the network. By providing this first visualization on the user interface, the system enables users to gain a clear and structured view of the network configuration. They can easily identify the first component at its hierarchical level and understand its relationship with other components, facilitating tasks such as network management, troubleshooting, and optimization.

In some embodiments, the system may allow a user to perform further actions (e.g., filtering, testing, etc.) based on the visualization. For example, the system may receive a first criterion for filtering one or more components in the first visualization and filter the one or more components in the first visualization based on the first criterion. In another example, the system may receive a first criterion for testing a first component in the first subset of components in the first software system. The system may determine a child component for the first component based on the first configuration and generate a result based on the first criterion, wherein the result indicates an effect of the first criterion on the child component. In yet another example, the system may determine a plurality of dependencies for the first subset of components in the first software system based on the first configuration and store the plurality of dependencies in a centralized repository for the first software system. In yet another example, the system may receive a first criterion for searching for a first component in the first subset of components in the first software system and generate a result based on the first criterion, wherein the result indicates a location of the first component in the first subset of components.

For instance, the system can receive a first criterion for filtering one or more components in the first visualization. This criterion could be based on component type, status, performance metrics, or any other relevant attribute. Upon receiving the filtering criterion, the system dynamically updates the visualization, highlighting or hiding components that meet the specified criterion. This allows users to focus on specific parts of the network, making it easier to identify and address issues or analyze particular aspects of the network configuration. In another example, the system can receive a first criterion for testing a first component within the network. This might involve performance tests, security checks, or functional validations. The system identifies a child component that relies on the first component, based on the hierarchical and dependency mappings from the first configuration. It then applies the testing criterion to the first component and observes the effects on the child component. The results, which indicate the impact of the test on both the first component and its child component, are generated and displayed to the user. This helps in understanding how changes or tests on one part of the network affect other interconnected parts.

Additionally, the system can determine a plurality of dependencies for a subset of components within the network. By analyzing the configuration and the interactions between components, the system identifies and maps out these dependencies. This information is stored in a centralized repository, providing a comprehensive view of how components are interrelated. This repository can be queried to understand the software applications structure better, plan for changes, and ensure that any modifications do not negatively impact dependent components.

The system also supports searching for specific components within the network. A user can input a criterion, such as a component's name, ID, type, or any other identifier. The system searches through the network configuration and the software applications lineage logs to locate the specified component. The result, which includes the component's location and contextual information, is displayed to the user. This functionality helps quickly locate components within large and complex network configurations, facilitating efficient network management and troubleshooting. By providing these interactive features, the system enhances the user's ability to manage and optimize the network. Users can filter views to focus on relevant components, test components and observe downstream effects, analyze dependencies, and quickly locate specific components. This makes the visualization not just a static representation, but a dynamic tool for proactive network management.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for real-time mapping and visualization generation of system components.
2. The method of the preceding embodiment, further comprising: receiving a first user request to generate a first visualization of a first configuration of a first subset of components in a first software system; in response to the first user request, retrieving a first software applications lineage log, wherein the first software applications lineage log comprises a log of event data of current processes being performed in the first software system; generating a first feature input based on the first software applications lineage log; inputting the first feature input into a first artificial intelligence model to generate a first output, wherein the first artificial intelligence model is trained by: generating first training data based on historical software applications lineage logs that indicate respective time stamps, event names, components, or other data for known software system configurations performing known processes; and training, using the first training data, the first artificial intelligence model to generate outputs comprises predicted software system configurations based on inputs of current software applications lineage logs; and generating for display, on a user interface, the first visualization based on the first output.
3. The method of any one of the preceding embodiments, wherein generating the first output further comprises: determining a first component in a first hierarchical level in the first configuration; and determining a parent component for the first component based on the first feature input indicating that the parent component inputs processing data to the first component in the first configuration.
4. The method of any one of the preceding embodiments, wherein generating the first output further comprises: determining a first component in a first hierarchical level in the first configuration; and determining a child component for the first component based on the first feature input indicating that the child component receives processing data from the first component in the first configuration.
5. The method of any one of the preceding embodiments, wherein generating the first output further comprises: determining a first component in a first hierarchical level in the first configuration; and determining a second component in the first hierarchical level in the first configuration based on the first feature input indicating that the first component generates a first event datum within a threshold time of the second component generating a second event datum.
6. The method of any one of the preceding embodiments, wherein generating the first output further comprises: determining a first component in a first hierarchical level in the first configuration; and determining a second component in the first hierarchical level in the first configuration based on the first feature input indicating that a third component receives processing data from both the first component and the second component.
7. The method of any one of the preceding embodiments, wherein generating the first output further comprises: determining a first component in a first hierarchical level in the first configuration; and determining a second component in the first hierarchical level in the first configuration based on the first feature input indicating that a third component transmits processing data to both the first component and the second component.

8. The method of any one of the preceding embodiments, wherein generating the first output further comprises: detecting an inconsistency between a determined hierarchical level in the first configuration for a first component in a first hierarchical level in the first configuration and a first event datum for the first component; and in response to detecting the inconsistency, querying the first software applications lineage log for additional event data.

9. The method of any one of the preceding embodiments, wherein generating the first output further comprises: detecting an inconsistency between a determined hierarchical level in the first configuration for a first component in a first hierarchical level in the first configuration and a first event datum for the first component; and in response to detecting the inconsistency, querying a supplemental data source of potential network configurations of the first software system.

10. The method of any one of the preceding embodiments, wherein training, using the first training data, the first artificial intelligence model further comprises: training a tree component classifier to classify nodes into component types; and training the tree component classifier to identify edges between the nodes.

11. The method of any one of the preceding embodiments, wherein generating for display, on the user interface, the first visualization further comprises: determining a first component in a first hierarchical level in the first configuration; and generating a first architecture diagram of a plurality of components in the first visualization, wherein the first component is included in the plurality of components at the first hierarchical level of the first architecture diagram.

12. The method of any one of the preceding embodiments, wherein generating for display, on the user interface, the first visualization further comprises: receiving a first criterion for filtering one or more components in the first visualization; and filtering the one or more components in the first visualization based on the first criterion.

13. The method of any one of the preceding embodiments, wherein generating for display, on the user interface, the first visualization further comprises: receiving a first criterion for testing a first component in the first subset of components in the first software system; determining a child component for the first component based on the first configuration; and generating a result based on the first criterion, wherein the result indicates an effect of the first criterion on the child component.

14. The met method of any one of the preceding embodiments, wherein generating for display, on the user interface, the first visualization further comprises: determining a plurality of dependencies for the first subset of components in the first software system based on the first configuration; and storing the plurality of dependencies in a centralized repository for the first software system.

15. The method of any one of the preceding embodiments, wherein generating for display, on the user interface, the first visualization further comprises: receiving a first criterion for searching for a first component in the first subset of components in the first software system; and generating a result based on the first criterion, wherein the result indicates a location of the first component in the first subset of components.

16. The method of any one of the preceding embodiments, wherein generating the first feature input based on the first software applications lineage log further comprises: processing the event data in the first software applications lineage log to remove inconsistencies; and processing the event data in the first software applications lineage log to populate missing data.

17. The method of any one of the preceding embodiments, wherein generating the first feature input based on the first software applications lineage log further comprises: processing the event data in the first software applications lineage log to detect a first time stamp; and ordering the event data based on the first time stamp.

18. A tangible, non-transitory, computer-readable medium storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

What is claimed is:

1. A system for real-time mapping and visualization generation of system components, the system comprising:
   receiving a first user request to generate a first visualization of a first configuration of a first subset of components in a first software system, wherein the first visualization comprises a hierarchical workflow mapping of the first subset of components, and wherein the hierarchical workflow mapping indicates upstream and downstream connections of the first subset of components when processing user requests;
   in response to the first user request, retrieving a first software applications lineage log, wherein the first software applications lineage log comprises a log of event data of current processes being performed in the first software system, wherein the log of event data comprises a plurality of characteristics for each event in the event data, wherein the plurality of characteristics includes a time stamp, component identifier, and process identifier;
   generating a first feature input based on the first software applications lineage log;
   inputting the first feature input into a first artificial intelligence model to generate a first output, wherein generating the first output further comprises determining a first component in a first hierarchical level in the first configuration and determining a second component in the first hierarchical level in the first configuration based on the first feature input indicating that a third component transmits processing data to both the first component and the second component, and wherein the first artificial intelligence model is a tree component classifier, and wherein the first artificial intelligence model is trained by:
      generating first training data based on historical software applications lineage logs that indicate respective time stamps, event names, components, or other data for known software system configurations performing known processes; and
      training, using the first training data, the first artificial intelligence model to generate outputs comprises predicted software system configurations based on inputs of current software applications lineage logs;
   generating for display, on a user interface, the first visualization based on the first output, wherein the first visualization comprises a first mapping of a first selectable icon for the first component in the first configuration;

receiving, based on a selection of the first selectable icon, a second user request to perform a test of the first component in the first subset of components as shown in the first visualization;

determining a child component for the first component based on the first visualization; and generating a result to the test based on an effect on the child component.

2. A method for real-time mapping and visualization generation of system components, the method comprising:

receiving a first user request to generate a first visualization of a first configuration of a first subset of components in a first software system;

in response to the first user request, retrieving a first software applications lineage log, wherein the first software applications lineage log comprises a log of event data of current processes being performed in the first software system;

generating a first feature input based on the first software applications lineage log;

inputting the first feature input into a first artificial intelligence model to generate a first output, wherein generating the first output further comprises determining a first component in a first hierarchical level in the first configuration and determining a second component in the first hierarchical level in the first configuration based on the first feature input indicating that a third component transmits processing data to both the first component and the second component, and wherein the first artificial intelligence model is trained by:

generating first training data based on historical software applications lineage logs that indicate respective time stamps, event names, components, or other data for known software system configurations performing known processes; and training, using the first training data, the first artificial intelligence model to generate outputs comprises predicted software system configurations based on inputs of current software applications lineage logs;

generating for display, on a user interface, the first visualization based on the first output, wherein the first visualization comprises a first mapping of a first selectable icon for the first component in the first configuration;

receiving, based on a selection of the first selectable icon, a second user request to perform a test the first component as shown in the first visualization;

determining a child component for the first component based on the first visualization; and generating a result to the test based on an effect on the child component.

3. The method of claim 2, wherein generating the first output further comprises:

determining the first component in the first hierarchical level in the first configuration; and determining a parent component for the first component based on the first feature input indicating that the parent component inputs the processing data to the first component in the first configuration.

4. The method of claim 2, wherein generating the first output further comprises:

determining the first component in the first hierarchical level in the first configuration; and determining the child component for the first component based on the first feature input indicating that the child component receives the processing data from the first component in the first configuration.

5. The method of claim 2, wherein generating the first output further comprises:

determining the first component in the first hierarchical level in the first configuration; and determining the second component in the first hierarchical level in the first configuration based on the first feature input indicating that the first component generates a first event datum within a threshold time of the second component generating a second event datum.

6. The method of claim 2, wherein generating the first output further comprises:

determining the first component in the first hierarchical level in the first configuration; and determining the second component in the first hierarchical level in the first configuration based on the first feature input indicating that the third component receives the processing data from both the first component and the second component.

7. The method of claim 2, wherein generating the first output further comprises:

detecting an inconsistency between a determined hierarchical level in the first configuration for the first component in the first hierarchical level in the first configuration and a first event datum for the first component; and in response to detecting the inconsistency, querying the first software applications lineage log for additional event data.

8. The method of claim 2, wherein generating the first output further comprises:

detecting an inconsistency between a determined hierarchical level in the first configuration for the first component in the first hierarchical level in the first configuration and a first event datum for the first component; and in response to detecting the inconsistency, querying a supplemental data source of potential network configurations of the first software system.

9. The method of claim 2, wherein training, using the first training data, the first artificial intelligence model further comprises:

training a tree component classifier to classify nodes into component types; and training the tree component classifier to identify edges between the nodes.

10. The method of claim 2, wherein generating for display, on the user interface, the first visualization further comprises:

determining the first component in the first hierarchical level in the first configuration; and generating a first architecture diagram of a plurality of components in the first visualization, wherein the first component is included in the plurality of components at the first hierarchical level of the first architecture diagram.

11. The method of claim 2, wherein generating for display, on the user interface, the first visualization further comprises:

receiving a first criterion for filtering one or more components in the first visualization; and filtering the one or more components in the first visualization based on the first criterion.

12. The method of claim 2, wherein generating for display, on the user interface, the first visualization further comprises:
   receiving a first criterion for testing the first component in the first subset of components in the first software system;
   determining the child component for the first component based on the first configuration; and
   generating the result based on the first criterion, wherein the result indicates an effect of the first criterion on the child component.

13. The method of claim 2, wherein generating for display, on the user interface, the first visualization further comprises:
   determining a plurality of dependencies for the first subset of components in the first software system based on the first configuration; and
   storing the plurality of dependencies in a centralized repository for the first software system.

14. The method of claim 2, wherein generating for display, on the user interface, the first visualization further comprises:
   receiving a first criterion for searching for the first component in the first subset of components in the first software system; and
   generating the result based on the first criterion, wherein the result indicates a location of the first component in the first subset of components.

15. The method of claim 2, wherein generating the first feature input based on the first software applications lineage log further comprises:
   processing the event data in the first software applications lineage log to remove inconsistencies; and
   processing the event data in the first software applications lineage log to populate missing data.

16. The method of claim 2, wherein generating the first feature input based on the first software applications lineage log further comprises:
   processing the event data in the first software applications lineage log to detect a first time stamp; and
   ordering the event data based on the first time stamp.

17. One or more non-transitory, computer-readable mediums, comprising instructions that, when executed by one or more processors, cause operations comprising:
   receiving a first user request to generate a first visualization of a first configuration of a first subset of components in a first software system;
   in response to the first user request, retrieving a first software applications lineage log, wherein the first software applications lineage log comprises a log of event data of current processes being performed in the first software system;
   generating a first feature input based on the first software applications lineage log;
   inputting the first feature input into a first artificial intelligence model to generate a first output, wherein generating the first output further comprises determining a first component in a first hierarchical level in the first configuration and determining a second component in the first hierarchical level in the first configuration based on the first feature input indicating that a third component transmits processing data to both the first component and the second component, and wherein the first artificial intelligence model is trained to generate outputs comprising predicted software system configurations based on inputs of current software applications lineage logs;
   generating for display, on a user interface, a first selectable icon for the first component in the first visualization based on the first output;
   receiving, based on a selection of the first selectable icon, a second user request to perform a test the first component in the first subset of components as shown in the first visualization;
   determining a child component for the first component based on the first visualization; and
   generating a result to the test based on an effect on the child component.

18. The one or more non-transitory, computer-readable mediums of claim 17, wherein generating the first output further comprises:
   determining the first component in the first hierarchical level in the first configuration; and
   determining a parent component for the first component based on the first feature input indicating that the parent component inputs the processing data to the first component in the first configuration.

19. The one or more non-transitory, computer-readable mediums of claim 17, wherein instructions further cause operations comprising:
   determining the first component in the first hierarchical level in the first configuration; and
   determining the child component for the first component based on the first feature input indicating that the child component receives the processing data from the first component in the first configuration.

* * * * *